United States Patent [19]

Rick et al.

[11] 4,122,521

[45] Oct. 24, 1978

[54] CORRELATION SYSTEM FOR MULTIPLE-SENSOR RECONNAISSANCE VEHICLE

[75] Inventors: Horst Rick, Torrance; Richard A. Keppel, Long Beach; Harvey A. Mitchell, Harbor City; Lowell V. Olsen, Gardena; James K. Colas, Running Springs; Robert E. Tracy, Rialto, all of Calif.

[73] Assignee: Northrop Corporation, Los Angeles, Calif.

[21] Appl. No.: 787,270

[22] Filed: Apr. 13, 1977

Related U.S. Application Data

[63] Continuation-in-part of Ser. No. 624,116, Oct. 20, 1975, abandoned.

[51] Int. Cl.² ............................................. G06F 15/50
[52] U.S. Cl. .................................... 364/424; 33/1 A; 343/5 PC; 364/456; 364/443; 364/516
[58] Field of Search ........... 235/150.2, 150.26, 150.27; 343/5 CM, 5 DP, 5 PC, 6 A, 6 TV, 112 C; 33/1 A, 18 C; 354/21, 65, 66, 68, 69, 71, 72, 73, 75; 178/15; 358/109, 139, 903, 130, 131, 132; 364/424, 443, 444, 449, 456, 514, 516

[56] References Cited

U.S. PATENT DOCUMENTS

| | | | |
|---|---|---|---|
| 3,507,993 | 4/1970 | Mulley | 235/150.27 X |
| 3,725,912 | 4/1973 | Buchholz et al. | 343/5 PC |
| 3,725,915 | 4/1973 | Herman et al. | 343/5 PC |
| 3,752,915 | 8/1973 | Parker et al. | 358/109 X |
| 3,864,513 | 2/1975 | Halajian et al. | 358/109 |
| 3,930,118 | 12/1975 | Midland et al. | 358/130 |

Primary Examiner—Joseph F. Ruggiero
Attorney, Agent, or Firm—Edward A. Sokolski

[57] ABSTRACT

A plurality of sensors of various types each initiating a marker signal as it produces a "frame" of information sensed, such as a camera film frame for example. A computer in the navigation system of the reconnaissance craft receives the marker signals and generates respective successive frame count numbers which are fed back to the proper respective sensors and recorded directly on the individual frames to whch they pertain while the frames are still being taken or sensed by the sensors. At essentially the same time as the frame count number is being processed, the computer outputs a block of information to be stored and recorded for that one frame (sensor product), this information including the identifying frame count number, the sensor which took it, the time of occurrence, and the geographical location of the event as provided by the navigation system. Thus, each frame of intelligence gathered and later processed on the ground is simply correlated with the recorded block of desired data concerning it by a ground interpreter. An additional feature is a process of including photographic and location data of certain known ground sites during the same reconnaissance flight, providing a comparison capability to enable correction of any navigation system biases and thereby obtain very precise geographic coordinate location of the sensor products.

10 Claims, 11 Drawing Figures

CORRELATION SYSTEM FOR MULTIPLE-SENSOR RECONNAISSANCE VEHICLE

This application is a continuation in part of our application Ser. No. 624,116, filed Oct. 20, 1975, now abandoned.

BACKGROUND OF THE INVENTION

The invention herein described was made in the course of a contract with the United States Air Force. The present invention relates to multiple-sensor airborne reconnaissance systems, and more particularly, to a novel and rapid means for correlating the discrete products of the sensors and determining their geographic locations. The "sensors" are any of cameras, magnetic recording devices, a radar set, or other type of detector, all capable of simultaneous operation in the same system.

In conventional photo-reconnaissance systems where camera photos of the ground are taken from an aircraft flying along an area of interest, for example, the photo interpreter on the ground after the flight requires many hours to positively establish the location of the first picture or frame, and many additional hours for each following frame in succession, one by one. Where many photos are taken, especially from a plurality of cameras or other types of sensors, this large amount of time consumed is obviously unsatisfactory. The problem is that there seems to be no system or method using a common basic reference for correlation of the sensor events or outputs as they occur, and no fast accurate method of obtaining corresponding location or other data for the sensor products after they have been developed or processed, on the ground.

Accordingly, it is an object of the present invention to provide a sensor correlation system wherein, as soon as the collected and recorded data is available for inspection, any one selected photo frame or sensor product of interest can be immediately checked in a single simple step to determine its precise geographic location. Conversely, it is another object of this invention to provide a sensor correlation system wherein it can be determined, by a single simple scanning of a list, which sensor products (if any) cover any desired geographic locations of interest. In other words, the exact sensor product(s) for those locations can be identified and then picked out from all the collected data for examination.

A further object is to provide a sensor correlation system wherein no time-consuming step-by-step procedure for each individual successive information frame beginning with the first one taken, is required.

BRIEF SUMMARY OF THE INVENTION

Briefly, our invention comprises a correlation means and method wherein each sensor generates a marker signal for each frame of information which it takes or records and sends the signal to a computer associated with the navigation system of a reconnaissance vehicle. The computer produces a frame count number to identify each such frame in successive order of its occurrence, the frame numbers being in ascending numerical order for each sensor. The frame count number is sent back to the individual sensor which generated the corresponding marker signal and is recorded on that particular frame during the time it is being made or exposed. At the same time, the computer gathers and stores one line or block of information in a storage memory, this block containing the frame count number, the sensor number where the individual frame is to be found, the time of occurrence, the geographic location as read from the navigation system, and other data as desired, such as the altitude and attitude of an aircraft containing the present invention. For each following frame of information or reading from a sensor, the same procedure takes place. The stored or recorded blocks of information are later reduced or printed out to give a listing of all sensor activities arranged in the order of their occurrence and identified by the reference frame count number for each particular sensor. The intelligence content of each and every frame listed can thus be found immediately by going to that frame number of the designated sensor.

In addition, a method of getting extremely accurate coordinate location of each output frame is to proceed over a straight line course, for example, in the same area as where the reconnaissance data is being gathered, taking one or a few photos of a first location and a second, distant, location which are absolutely known in longitude and latitude beforehand, with the same system as described above, then comparing the listed results from this present system with the known information of the two locations to determine the error or bias of the navigation system, and then applying the proper difference correction to each line of recorded location as gathered.

This invention may be more fully understood by reference to the following description of a preferred embodiment and mode of operation read in conjunction with the accompanying illustrative drawings.

DETAILED DESCRIPTION OF INVENTION

Figure 1:
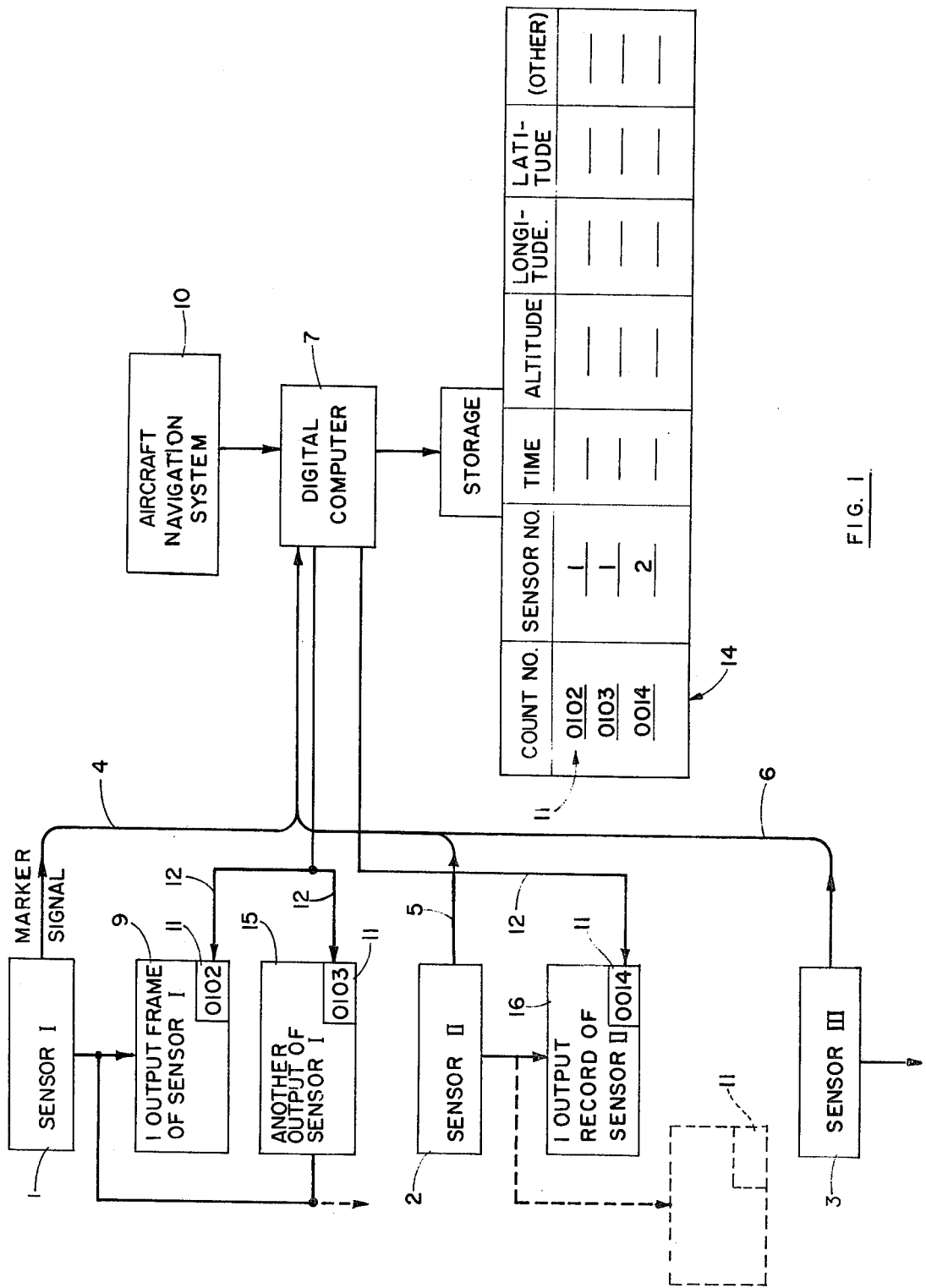
FIG. 1 is a functional block diagram of a sensor system incorporating the present invention.

Referring first to FIG. 1 for an overall view of the system, three sensors 1, 2 and 3 are shown. As mentioned before, more sensors may be used. The embodiment to be described as an example accommodates seven sensors. Each sensor generates a marker signal when an event is being sensed by that sensor and sends it via a marker line 4, 5 or 6 to a digital computer 7. Assuming sensor 1 is a camera, it produces an output frame 9. The computer processes the event (frame) marker signal, computes and stores the precise event time, the aircraft's position from a navigation system 10, and other data. In addition, computer 7 simultaneously stores and transmits a frame count number 11 for each marker signal back to the respective sensor on the proper frame count line 12 to be impressed on the corresponding output frame 9. Various navigation parameters along with the corresponding frame count numbers 11 are recorded on a magnetic tape 14 for use by intelligence interpreters on the ground. As can be seen, a print-out of the tape 14 has recorded on it a number of lines of information, each line containing the frame count number 11, sensor number, and all the identifying information about a sensor event, and this line refers to the photographic or other intelligence content of the respective sensor number and frame number thereof. The frame count number 11 also entered on the photographic frame itself positively and quickly identifies the information listed on the tape 14.

In turn, the next output event (frame) 15 of the first sensor 1 is similarly handled, together with the other sensors 2 and 3 which may be simultaneously operating and collecting their own sensed information on second sensor frame 16, etc. The point is that the simple basic correlating means is the frame count number 11, which is started by the event at the individual sensor, carried to the computer 7, given its number, and sent back to the sensor in time to be actually indicated in readable form on the intelligence-containing frame itself of that sensor and that sensor only.

Figure 2:
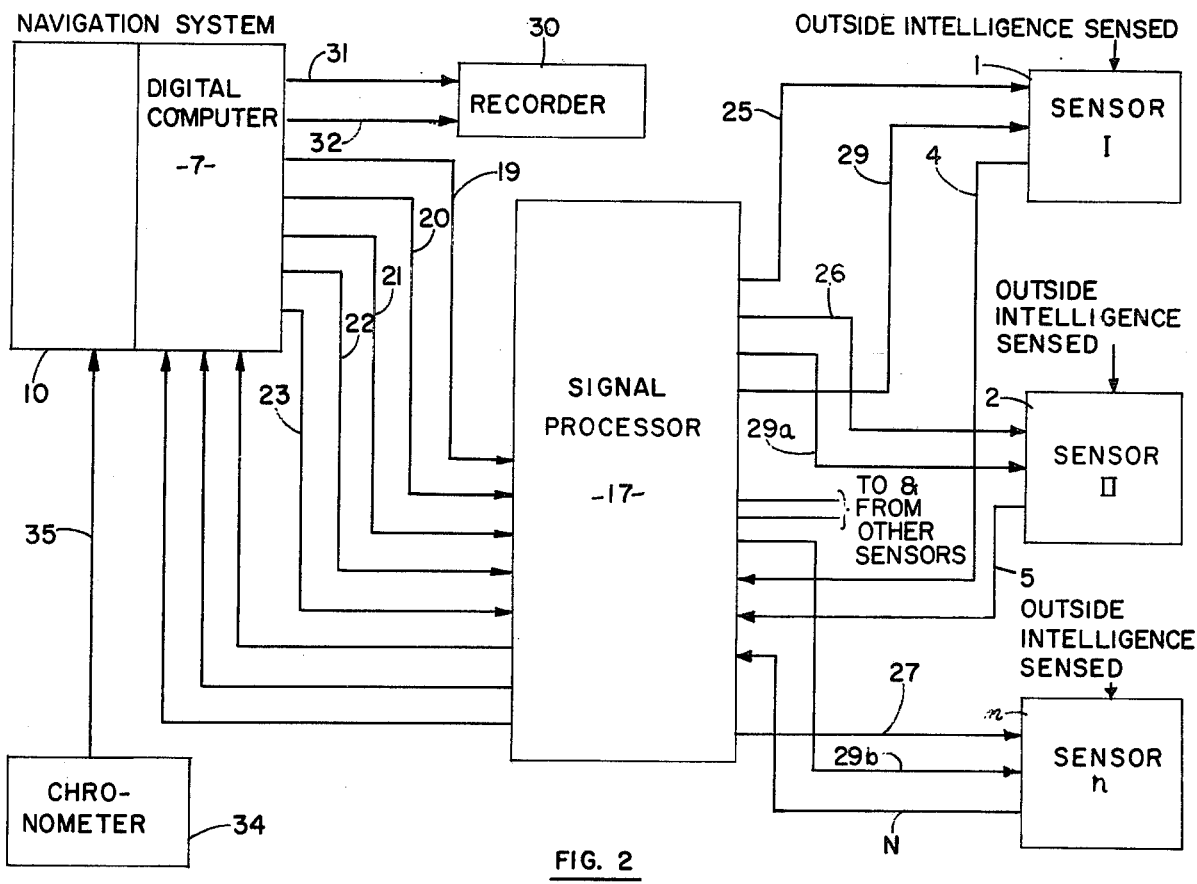
FIG. 2 is an overall component block diagram of the system.

Referring now to FIG. 2, each sensor 1, 2, –n actually sends its marker signals on marker lines 4, 5, –N to a signal processor 17 which in turn sends it on to the computer 7. The computer generates and sends back to the signal processor 17 the sensor event number (frame count number) 11 in preferably serial form on a frame count line 19, a three-bit sensor number in parallel form on sensor number code lines 20, 21 and 22, and a correlating clock pulse signal on clock signal line 23. The clock signal, as is conventional in digital computers, is formed from a clock pulse generator 28 (FIG. 7) in the computer 7, which is common technology. From the processor 17, the frame count number 11 in serial form is sent to the proper sensor on either frame count lead 25, 26 or 27, together with the clock pulse signal on clock signal leads 29, 29a and 29b. For the purpose of our invention, however, it is not mandatory that the frame count number be in serial format.

The computer 7 further sends all the data to be recorded for one event to a tape recorder 30 (in preferably serial form) on recording line 31, together with the same clock pulse signal on clock signal conductor 32. A chronometer 34 provides the correct time in pulse form to the navigation system 10 on time line 35.

Figure 3:
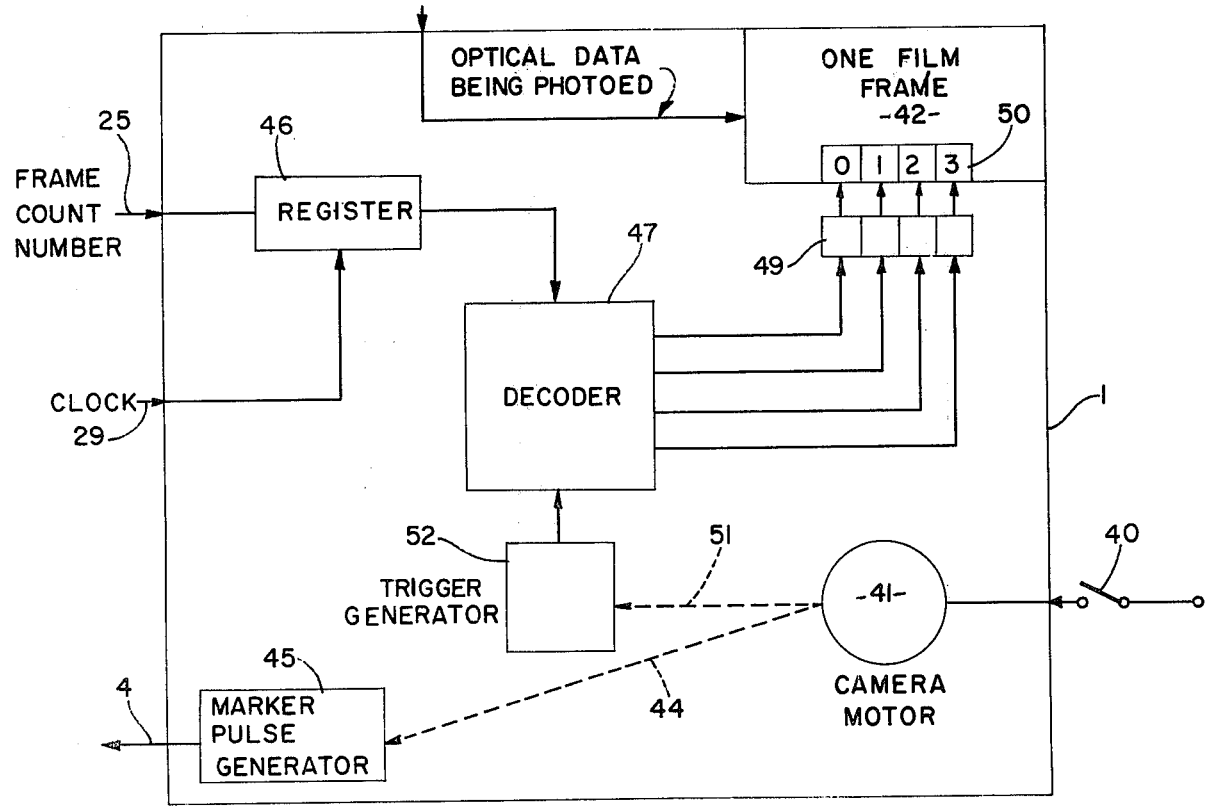
FIG. 3 is a block diagram of a camera used as a first sensor.

FIG. 3 shows the detailed operation of this invention starting with the structure of a sensor where the marker signals first originate. In this drawing the sensor 1 is an airborne photographic camera which may be started or stopped at any time by means of a first on-off switch 40 controlling a camera motor 41. As the camera runs, a series of film frames such as the frame 42 is produced from a scene on the ground, for example. Somewhere near the start of exposure of each frame, a mechanical connection 44 from the motorized film drive triggers a marker pulse generator 45 which produces a marker pulse on output marker line 4. This pulse is transmitted through the signal processor 17 to the computer 7, starting the train of operation resulting in the proper frame number 11 for the frame now being taken to be serially entered on frame count lead 25 to a holding register 46 in the sensor package 1. Clock pulses on clock signal lead 29 read out the frame number to a decoder 47 comprising well known control logic. This decoder 47 supplies voltages to the proper elements of a display unit 49 comprising a plurality of light-emitting diodes, for example, which are thus illuminated to indicate the frame count number. Optical means (not shown) produces an image 50 of the count number directly on a chosen portion of the film frame 42, such as in a lower corner for example. In order to synchronize the time of the exposure of the display unit 49 with the film, another mechanically operated interconnect 51 triggers a trigger generator 52 which releases the output of the decoder 47 at a chosen time and position portion of the film exposure period. This may be near the center of the frame length, at the end, or between frames, for example. Therefore, one marker pulse from the sensor 1 and one entry of the frame count number 11 occur for each film frame taken, the marker pulses and the entries both being produced one frame period apart during camera operation. Obviously the details of this camera sensor can be modified as desired.

Figure 4:
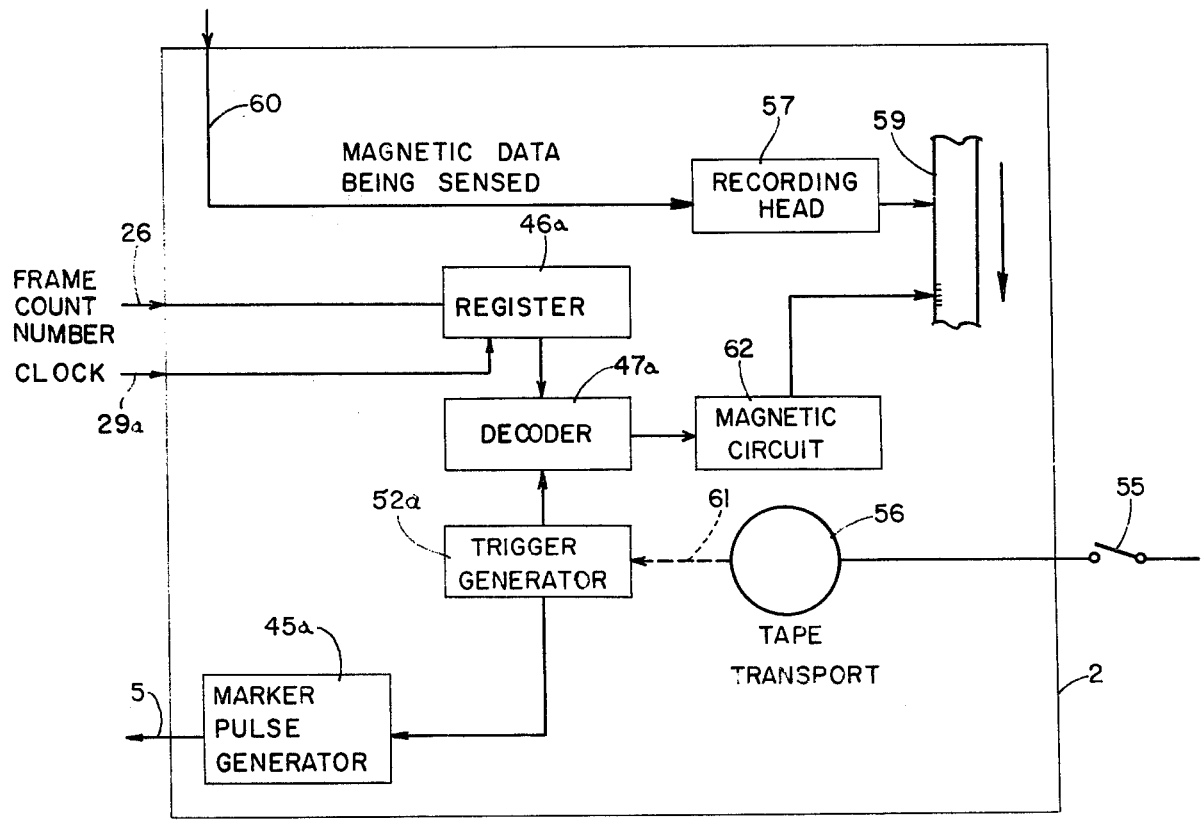
FIG. 4 is a diagram of a magnetic recording device used as a second sensor.

FIG. 4 shows details of the sensor 2 constituting a magnetic recording device, for example, which records events in sequential mode. It is illustrated as comprising a second on-off switch 55, a conventional tape transport 56, recording head 57 and magnetic recording medium 59 such as tape. Magnetic data being sensed on input line 60 is thus recorded by this sensor.

This magnetic sensor 2 is arranged to function essentially equivalent to the camera sensor 1. Driving means 61 from the tape transport 56 controls a trigger generator 52a to cause a marker pulse generator 45a to emit a marker pulse on marker line 5 for each chosen fixed length or amount of magnetic medium 59, which amount is designated as a "frame" for purposes of this invention. Frame count lead 26 brings in from the computer 7 the proper frame count number for this sensor and enters it in a register 46a. It is clocked from there into a decoder 47a which drives a magnetic pulse circuit 62 (including an additional recording head) and thus records the frame count number onto the magnetic medium 59. The trigger generator 52a times the release of the frame number from the decoder 47a to the magnetic circuit 62. Instead of the additional recording head and magnetic pulse circuit 62, a summing junction or multiplexing device (not shown) might be provided in the main recording circuitry so that the existing recording head 57 may be used to impress the frame number on the medium 59. In this case, if recorder speed and frequency response are compatible with the serial output rate of the processor 17, the holding register 46a may be unnecessary, and only the trigger decoding logic 47a is required to initiate frame count number recording.

Figure 5:
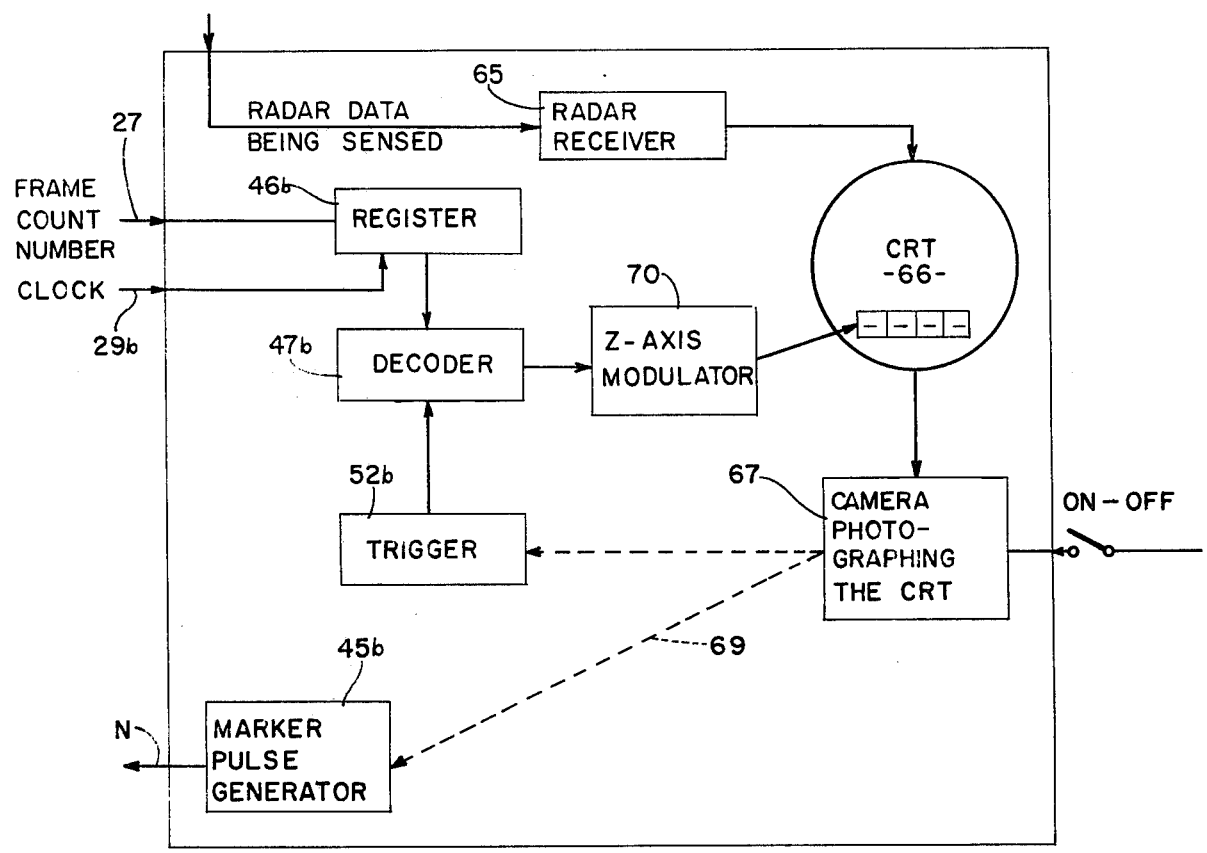
FIG. 5 is a diagram of a radar device used as a third sensor.

FIG. 5 shows a third sensor as being a radar device. There are several ways by which to implement a radar set to fit the present invention, one example only being illustrated herein. Radar data being sensed is fed to a receiver 65 and the final desired information displayed on a cathode ray tube 66. An oscilloscope camera 67 photographs the CRT 66 as often as desired, each camera picture being a frame to be correlated in this sytem. Again, the camera 67 drives a mechanical link 69 to energize another marker pulse generator 45b each time a frame is exposed, as in the other sensors 1 and 2. The frame count number sent back by computer 7 is entered in a holding register 46b and clocked into a decoder 47b.

Another mechanically operated trigger generator 52b subsequently empties the decoder 47b to apply the frame count number 11 to the photographed frame. The actual display is here accomplished on the CRT by a Z-axis modulator 70 operating from the decoder 47b and synchronized with the CRT deflection sweeps to properly position the frame number 11 on the CRT face as desired. Alternatively, an L.E.D. display might of course be coupled into the optical path to the oscilloscope camera 67 if display on the CRT face is not desired.

Other sensors, either more of the same type as hereinbefore described or other kinds may be adapted to be added to or substituted in the correlation system in accordance with the present invention. There is ample time from one sensor frame to the corresponding point in the next frame of the same sensor for the computer and other processing circuitry to receive each marker pulse and send back the frame count number to the sensor and imprint it on that one sensor frame.

Figure 6:
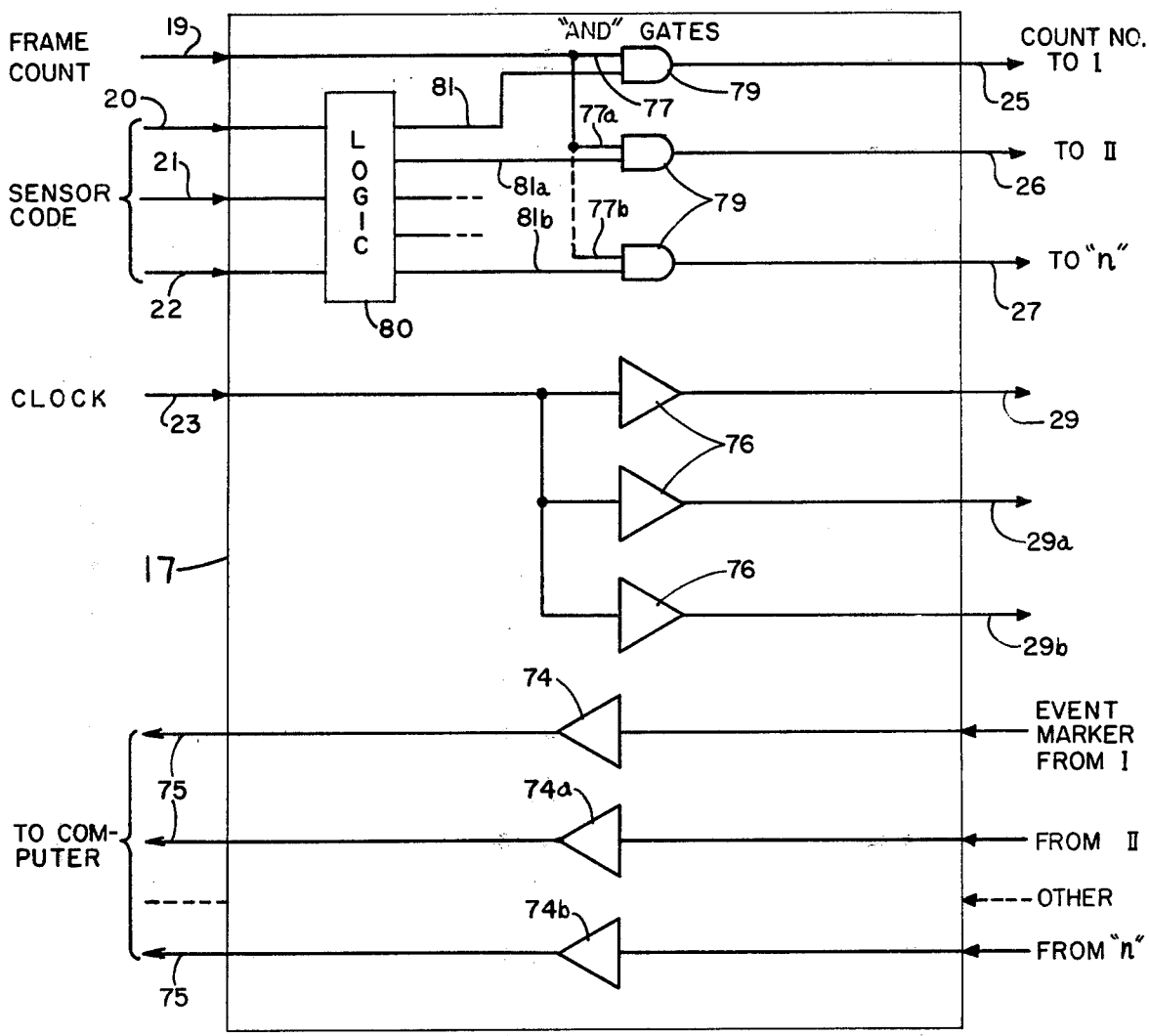
FIG. 6 is a block diagram of the signal processor of FIG. 2.

The signal processor 17 is further shown in FIG. 6. Here, the incoming marker pulses on lines 4, 5, N are each applied to a respective marker amplifier 74, 74a and 74b before going from the processor 17 to the computer 7 on their own separate marker pulse input lines 75. The clock pulses from the computer 7 on clock signal line 23 are fed in parallel to a number of clock signal amplifiers 76 equal to the number of sensors used in the system, and the identical signal appears on clock signal leads 29, 29a and 29b from the outputs of each respective sensor used.

The frame count line 19 from the computer 7 enters the processor 17 and connects via gate input leads 77, 77a and 77b in parallel to a number of AND gates 79 equal to the number of sensors. The sensor number code lines 20, 21 and 22 enter the signal processor 17 from computer 7 and feed to a sensor select logic circuit 80. The output of this conventional type logic circuit energizes just one of a number of gate control leads 81, 81a and 81b, depending upon the binary coded input on the three-bit sensor code lines 20, 21 and 22. These three code lines will obviously provide enough capacity for seven sensors. More sensors could of course be accommodated by including a fourth code line to the logic 80. It is thus seen that the serial frame count number will appear on the output lead of only one AND gate 79 and hence will go only to the sensor to which it belongs, i.e., the one from which the last marker pulse came.

The digital computer 7 within the navigation system 10 contains information relative to real time, aircraft position (latitude, longitude), aircraft altitude, attitude and the like at all times. This information may be transmitted or fed out in the form of digital serial words, along with the usual controlling clock pulse signal, to the tape recorder 30, upon command.

Receipt of a marker pulse from a sensor by the computer initiates, essentially in parallel, two basic sequences of events.

I. The computer generates the frame count number 11 for the particular sensor number. The frame count number generally starts with number 0001 and for each subsequent event (frame) for that particular sensor, the previous computer memory stored number is increased by 0001. The frame count number is fed to the signal processor 17 in serial format on frame count line 19, along with the correlation clock signals on clock signal line 23. At the same time, the sensor number designation is supplied from the computer in parallel format on the three sensor number code lines 20, 21 and 22, which three-bit code allows for unambiguous selection of any one of up to seven sensors. One additional code line will provide for 15 sensors, and so on.

II. The computer initiates the process of "outputting" to the recorder 30 on the recording line 31 the various information in preferably serial format mentioned before in regard to FIG. 1, along with the correlation clock pulse signal on clock signal conductor 32.

Figure 7:
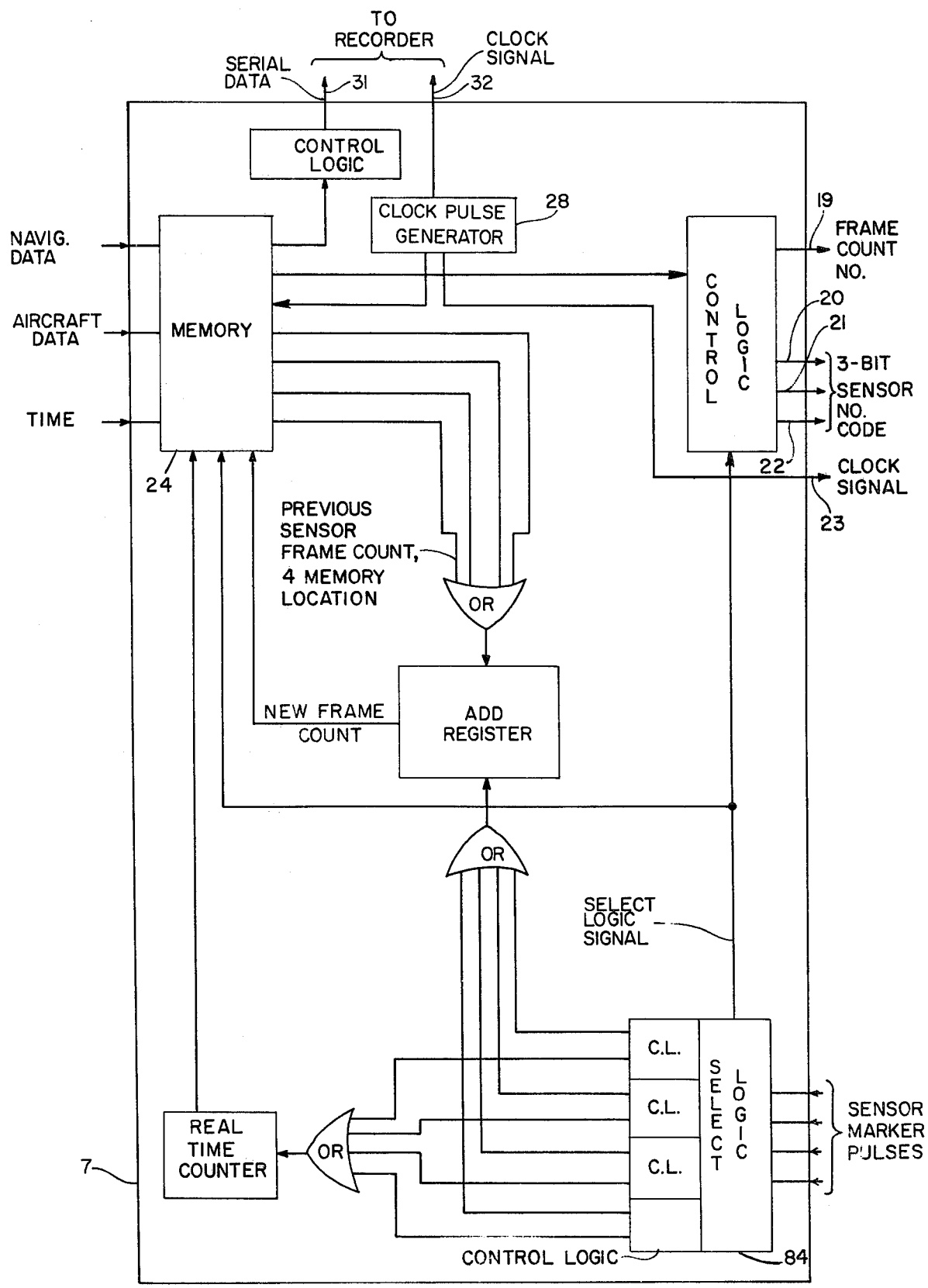
FIG. 7 is a block diagram showing typical components in the computer.

If more than one sensor marker pulse occurs simultaneously, computer 7 processes the signals in a priority sequence, i.e., one after another, in an anti-coincidence detector which is part of the select logic block 84 in FIG. 7.

This computer 7 may be any general purpose digital computer programmed by well known techniques to provide the above required functions. FIG. 7 illustrates the general computer make-up. Various different manners of implementing the computer for this job are of course suitable in the actual practice of this invention.

Figure 9:
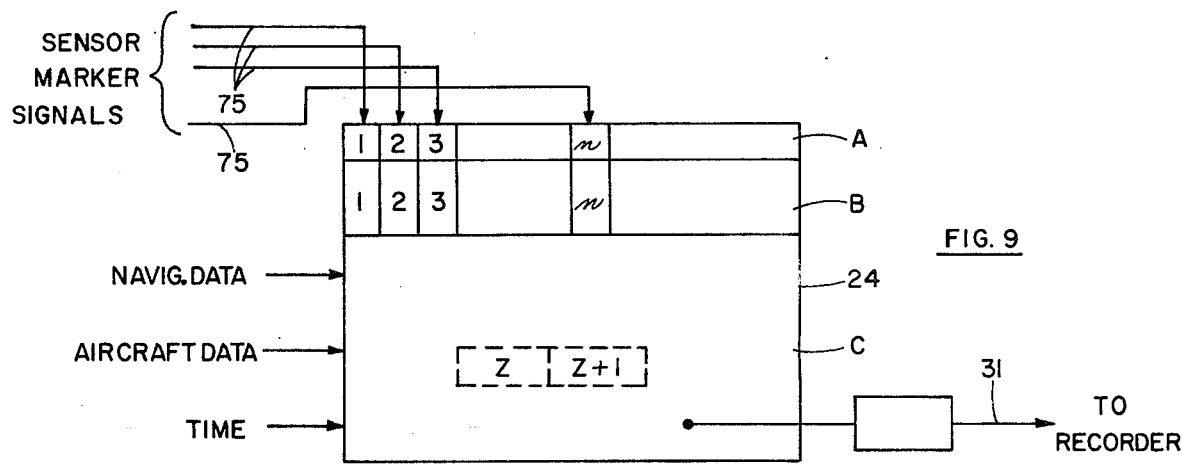
FIG. 9 is a block diagram illustrating the functions of the computer of FIG. 7, and FIGS. 10 and 11 are flow charts illustrating the programming of the computer of FIG. 7.

The following will explain one way the computer could be implemented to enable operation of the present invention. The navigation system computer 7 in the vehicle in which this invention is incorporated is programmed to compute navigation and other data, as is customary. The system of the invention employs such computer which will be adapted (further programmed) to function as required. FIG. 9 shows the computer memory 24 divided into sections A, B and C, for example, which can be memory portions or channels of any common digital computer. These sections will be briefly explained so that the following flow charts of software operation in FIGS. 10 and 11 will be clarified.

Memory section C contains the main navigation program which is continuously executing instructions at a rate determined by the computer clock pulse generator 28. This main program was initially started at a very precise time according to Coordinated Universal Time (C.U.T.) as determined by external input from a chronometer synchronized with radio station WWV for example. During program execution, data from the aircraft data computer and from the navigation system are received and manipulated by this program to compute the craft's location as precisely as possible in latitude and longitude.

The main program in section C is recycled or repeated at a rate R while being internally interrupted periodically at a rate which is a multiple of R, i.e., faster. One reason for these regular interruptions is to increment the initially read time (C.U.T.) to keep an accurate updating of time, since the outside chronometer was read only at the start, and from then on, time is kept by a precise crystal control within the system which is read each second, for example. During cycling of the program in section C, data necessary to the system is being outputted from C to recorder 30 (see FIG. 2) at a certain known constant rate compatible with recorder speed capability. This program also functions to read the outputs of a real time counter 90 (FIG. 7) at precisely the times which the latitude and longitude are calculated and outputted to the recorder 30. The real time counter 90 counts at a rate faster than the above program interrupt, and by using this rate in conjunction with computer updated time, C.U.T. time T can be refined by shorter units (ΔT) to achieve greater resolution.

Memory section B contains programs which are executed only on demand by section C through subroutine call or the above program interrupt, or on demand from section A when an external interrupt preempts operation from C, such as may be called for in the operation of the present invention.

Memory section A comprises a series of storage locations which are hard-wired to respond to stimuli from external sources such as the sensor marker signals entering the computer on the marker pulse input lines 75. The storage locations contain a single program instruction which executes a "branch" or "jump" to the proper program in section B. As an example, when a marker pulse from sensor 2 on marker line 5 is activated, an external interrupt is generated which causes the main program in section C to cease operation at a step "z" for example. Control is then transferred to section A, memory location 2. The instruction residing in location 2 is executed and a "jump" to the program for sensor 2 activity in section B takes place. This latter program is executed uninterrupted to its completion, and control is then returned to C at step "z + 1" and normal operation resumed until again interrupted by some internal or external source.

Figure 10:
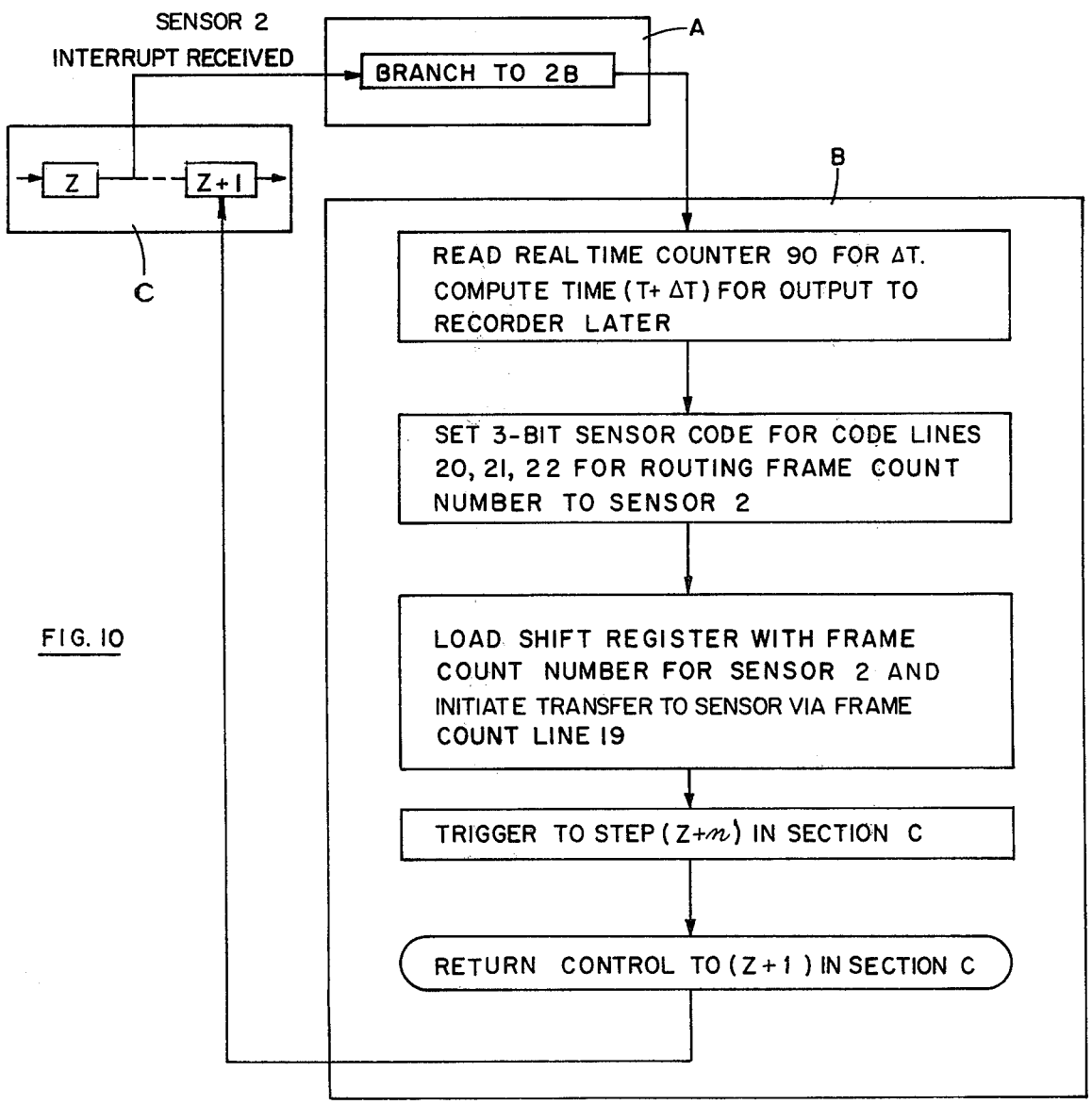
Figure 11:
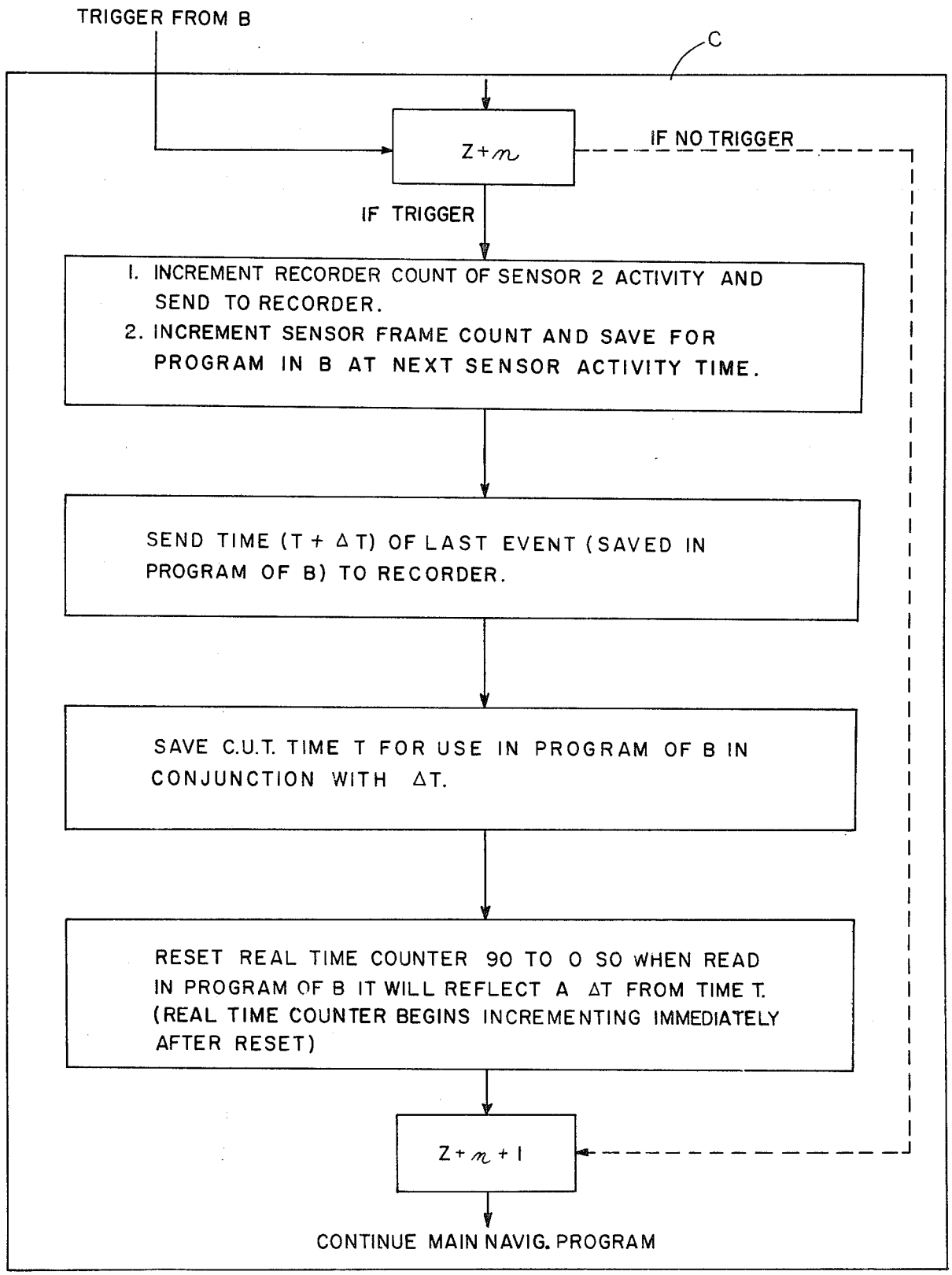

The present invention may be performed by programming the memory sections B and C as shown in FIGS. 10 and 11, respectively.

FIG. 10 shows the program path taken upon receipt of a sensor marker signal for sensor number 2 as an example. The main program in section C is briefly interrupted and control is transferred to section A via hardward functions. The software now executes the "branch" to section B. The software program in B manipulates data for an essentially real time output to sensor 2 of the identifying frame count number. Time (T + ΔT) is saved for outputting to recorder 30 (along with the frame count number) in a program imbedded in memory section C. The program in C has an iteration rate faster than the sensors can operate. Therefore, there can be no ambiguity of data presented on the recorder 30 when subsequently (on the ground usually) correlating a frame count number in the recorder with the same frame count number on the sensor intelligence frame. As shown in FIG. 10, the software instructions in section B have control over setting the three-bit sensor number code for computer output on code lines 20, 21 and 22, and over transmitting the frame count number from the computer on count line 19.

FIG. 11 illustrates the segment of the large program in section C which is triggered by the particular program executed in section B (FIG. 10). This program in C finishes the processing of the sensor activity and initializes parameters that will be used in section B at the time of the next sensor event.

While most general purpose computers can be programmed to perform the functions of digital computer 7, the preferred embodiment of the invention has been implemented with Northrop Computer Model NDC1070, manufactured by Northrop Corporation, Hawthorne, California. A program which implements the functions set forth in the flow charts of FIGS. 10 and 11 in the aforementioned Northrop computer, is set forth on the following pages as follows:

On pages 35 and 36 a summary of the assembler instructions is set forth, while on page 18 the repertoire for the program is set forth. The sensor code library for the program is set forth on pages 24 and 25. The program for a single sensor (sensor 2) is set forth on pages 26–34. The same program can be used for any of the other sensors. The various portions of the program are appropriately identified.

Thus, positive and rapid post-mission correlation of a photograph, for example, with its identification information from the tape recorder 30, for example, can easily be accomplished. As has been described, both the photograph (or other sensor output frame) and the recorded block of information carry the same frame count number, and the remainder of the recorded block gives the precise time of the frame event plus its geographical location and such other data as chosen to be included.

It will be noted that a variation of this system could be employed wherein, although the particular sensor from which each marker pulse comes must be identified, the frame count numbers could be assigned in successive order as they occur in *any* sensor instead of in *each* sensor. Thus, there would be no repetition of actual frame count numbers from the system, and numerical gaps could exist between frame count numbers of consecutive intelligence frames of any one sensor. In other words, frame count No. 0001 could be from sensor III, No. 0002 from sensor II, Nos. 0003–0004 from sensor I, No. 0005 from sensor IV, Nos. 0006–0010 from Sensor II, etc., for example, just as they happened to occur in actual time. Such variation is deemed to lie within the scope of the appended claims.

Figure 8:
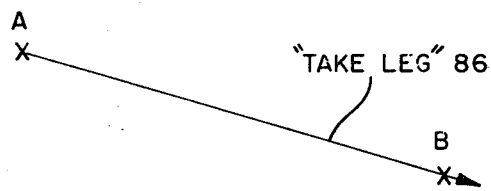
FIG. 8 is a plan diagram illustrating a correction procedure for obtaining more precise data from the sensor system.

The accuracy of the geographic location of the items recorded on film and the like by the sensors can be improved by the use of an additional procedure, involving the correction of navigation system errors. During the flight as the aircraft gathers the various sensor data, the aircraft would fly over two fairly well spaced and geographically known points normally located at the beginning and the end of a "take leg" 86 as shown in FIG. 8, taking one or a few photographs of them. Along the take leg 86 is where the sensor data would preferably be taken, and there can be more than one take leg on a given flight. From the location which the recorded flight information indicates these points to have, compared with the actual known locations, the navigation system error or bias can be found. Then the appropriate location correction factors can be computed and applied to all the recorded readings taken on that take leg 86, resulting in extreme accuracy of coordinate location. To apply this procedure in the simplest manner, the aircraft would fly a straight and level course over points A and B in the area of interest to determine the navigation errors. The check points, such as A and B, will of course be prominent structures, previously located land features, or other well mapped points.

By corrected reprint of the list of frame count number information shown in FIG. 1, i.e., corrected as to navigation system bias as just described, the processing time that has heretofore been required by ground interpreters will be greatly reduced.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

PROGRAMMING REPERTOIRE

| INSTRUCTION | LONG FORMAT | CODE | SHORT FORMAT | CODE | EA FORMAT | CODE | INDICATORS ZOL |
|---|---|---|---|---|---|---|---|
| ADD | L1 | F40B | S1 | B400 | E1 | 9600 | SSS - ARITH |
| ADDD | L1 | FC0B | S1 | BC00 | E1 | 9680 | SSS - ARITH |
| ADDM | L1 | F409 | S1 | 9400 | | | SSS - ARITH |
| BBK | | | S2 | D500 | | | --- DCBAMZOL |
| BRANCH COND. | L2 | 040X | S3 | +D0X0/-D8X0 | | | X IS COND. CODE |
| BSV | L1 | F80D | | | | | DCBAMZOL |
| BXU | L1 | F40C | S3 | -C400 | | | |
| BXUD | L1 | FC0C | S3 | -CC00 | | | |
| CLA | L1 | F40A | S1 | A400 | E1 | 9E00 | SOS - ARITH |
| CLAD | L1 | FC0A | S1 | AC00 | E1 | 9E80 | SOS - ARITH |
| CLAM | L1 | FC09 | S1 | 9C00 | | | SOS - ARITH |
| CLS | L1 | F00A | S1 | A000 | E1 | 8E00 | SSS - ARITH |
| CLSD | L1 | F80A | S1 | A800 | E1 | 8E80 | SSS - ARITH |
| CLSM | L1 | FC08 | S1 | 8C00 | | | SSS - ARITH |
| COM | L1 | F008 | S1 | 8000 | E1 | 9A00 | SSS - ARITH |
| COMD | L1 | F808 | S1 | 8800 | E1 | 9A80 | SSS - ARITH |
| COMM | L1 | F809 | S1 | 9800 | | | SSS - ARITH |
| DIV | | | S2 | D400 | | | SOS |
| DIVD | | | S2 | DC00 | | | SOS |
| EXT | L2 | E400 | | | | | SOS |
| EXTD | L2 | EC00 | | | | | SOS |
| FET | L1 | F00C | S1 | C000 | E1 | 8600 | SOS - [0] |
| FETD | L1 | F80C | S1 | C800 | E1 | 8680 | SOS - [0], [1] |
| FETM | L1 | F408 | S1 | 8400 | | | SOS - [0] |
| FLG | | | S4 | DE00 | | | --- |
| HLT | | | S2 | 0000/FC00 | | | |
| IDC | L1 | F80F | S2 | 0100 | | | SSS - I/O |
| LGC | | | S4 | DF00 | | | |
| MIEM, LSE | L1 | F405 | S1 | 5400 | E1 | 5600 | SOS |
| MIEDM, LSED | L1 | FC05 | S1 | 5C00 | E1 | 5680/5E00 | SOS |
| MPI | L1 | F406 | S1 | 6400 | E1 | 4600 | SOS |
| MPID | L1 | FC06 | S1 | 6C00 | E1 | 4680/4E00 | SOS |
| MPIM, LSA | L1 | F404 | S1 | 4400 | | | SOS |
| MPIDM, LSAD | L1 | FC04 | S1 | 4C00 | | | SOS |
| MPLM, RSL | L1 | F005 | S1 | 5000 | E1 | 5200 | SOS |
| MPLDM, RSLD | L1 | F805 | S1 | 5800 | E1 | 5280/5800 | SOS |
| MPY | L1 | F006 | S1 | 6000 | E1 | 4200 | SOS |
| MPYD | L1 | F806 | S1 | 6800 | E1 | 4280/4A00 | SOS |
| MPYM, RSA | L1 | F004 | S1 | 4000 | | | SOS |
| MPYDM, RSAD | L1 | F804 | S1 | 4800 | | | SOS |
| MRG | L2 | E000 | | | | | |
| MRGD | L2 | E800 | | | | | |
| NML | | | S2 | D600 | | | S-S |
| NMLD | | | S2 | DD00 | | | S-S |
| PIN 02 | L1 | F800 | S1 | 0800 | E1 | 0A00 | SOS - [0] |
| PIND 02 | | | | | E1 | 0A80 | SOS - [0],[1] |
| PIP | L1 | F40D | | | | | SSS - I/O |
| POP | L1 | FC0D | | | | | SSS - I/O |
| PRN | | | S2 | D700 | | | |
| PTR | L1 | F407 | S1 | 7400 | E2 | 7400 | |
| PTRD | L1 | FC07 | S1 | 7C00 | E2 | 7C00 | |
| RDF | | | S2 | 4000 | | | |
| SET | L1 | F00F | S2 | 0300 | | | SSS - I/O |
| SNS | L1 | F40F | S2 | 0200 | | | SSS - I/O |
| STA | L1 | F007 | S1 | 7000 | E2 | 7000 | |
| STAD | L1 | F807 | S1 | 7800 | E2 | 7800 | |
| SUB | L1 | F00B | S1 | B000 | E1 | 9200 | SSS - ARITH |
| SUBD | L1 | F80B | S1 | B800 | E1 | 9280 | SSS - ARITH |
| SUBM | L1 | F009 | S1 | 9000 | | | SSS - ARITH |
| XEQ | L1 | F00D | | | | | --- |

LOGICAL INSTRUCTIONS FOR PROGRAM

The Logical Instructions are:

| | | | | | |
|---|---|---|---|---|---|
| Compare | 62 | COM, | COMD, | COMM | |
| Normalize | 64 | NML, | NMLD | | |
| Extract | 66 | EXT, | EXTD | | |
| Merge | 68 | MRG, | MRGD | | |
| Flag | 70 | FLG | | | |
| Logic Control | 72 | LGC | | | |
| Read Flags | 74 | RDF | | | |
| Multiply Logical Immediate (and Right Shift Logical) | 76 | MPLM, (RSL, | MPLDM RSLD) | | |
| Multiply Integer End-Around Immediate (and Left Shift End-Around) | 80 | MIEM, (LSE, | MIEDM LSED) | | |
| Branch and Save | 84 | BSV | | | |
| Branch Back and Prune | 86 | BBK | | | |
| Branch Index Unequal | 88 | BXU, | BXUD | | |
| Conditional Branches | 90 | BUC | BNE | BGE | BRG |
| | | BLE | BRL | BRE | BNO |
| | | BAT | BAF | BBT | BBF |
| | | BCT | BCF | BDT | BDF |

SPECIAL INSTRUCTIONS FOR PROGRAM

The Special Instructions are:

| | | |
|---|---|---|
| Execute | 102 | XEQ |
| Halt | 104 | HLT |
| Programmed Instructions | 106 | PIN |

INPUT/OUTPUT INSTRUCTIONS FOR PROGRAM

The Input/Output Instructions are:

| | | |
|---|---|---|
| Parallel Input | 94 | PIP |
| Parallel Output | 96 | POP |
| Input/Output Control | 98 | IOC |
| Sense Discrete Input | 98 | SNS |
| Set Discrete Output | 98 | SET |

ARITHMETIC INSTRUCTIONS
FOR PROGRAM

The Arithmetic Instructions are:

| | | | | |
|---|---|---|---|---|
| Add | 46 | ADD, | ADDD, | ADDM |
| Subtract | 48 | SUB, | SUBD, | SUBM |
| Multiply Fractional | 50 | MPY, | MPYD, | MPYM |
| Multiply Integer | 54 | MPI, | MPID, | MPIM |
| Divide | 58 | DIV, | DIVD | |

LOAD AND STORE INSTRUCTIONS
FOR PROGRAM

The Load and Store Instructions are:

| | | | | |
|---|---|---|---|---|
| Clear and Add | 20 | CLA, | CLAD, | CLAM |
| Clear and Subtract | 22 | CLS, | CLSD, | CLSM |
| Store Accumulator | 24 | STA, | STAD | |
| Fetch | 26 | FET, | FETD, | FETM |
| Put Registers | 35 | PTR, | PTRD | |
| Prune | 42 | PRN | | |

```
                              SENSOR CODE LIBRARY                              CARD
                                                                               SEQUENCE
                                                                               NUMBERS
            **   SYSTEM BUFFER IOC CODES. UNLIKE THE SHORT IOC CODES THAT ACT AS    002380
            *    ANS PIP, POP, AND CON CODES, THESE IOC'S MUST BE LONG AND THEY     002390
            *    DO NOT REQUIRE A DELAY LIKE THE SHORT IOC'S. THE BUFFER DECODES    002400
            *    THESE IOC'S AS FOLLOWS: BIT 16 MUST BE ZERO, BITS 8 THROUGH 15     002410
            *    ARE NOT SIGNIFICANT, AND BITS 1 THROUGH 7 DEFINE THE OPERATION.    002420
ASSEMBLED   *    TO CAUSE THE ASSEMBLER TO FORM A LONG (32 BIT) IOC, THE CODES      002430
INTERRUPT   *    ALL HAVE BIT 13 SET TO A ONE TO FORM X(10XX).          SIGNAL      002440
"OPERANDS"  *                                                           NAME        002450
            INHIBIT_INTERRUPT_0;              INT 0 HAS HIGHEST         INT0X       002460
1000              EQU          X(1000)        PRIORITY (COMES IN                    002470
            ALLOW_INTERRUPT_0;                FIRST) IF TWO OR MORE                 002480
1001              EQU          X(1001)        INTERRUPTS OCCUR                      002490
            INHIBIT_S1_INTERRUPT;             SIMULTANEOUSLY            INT1X       002500
1002              EQU          X(1002)                                              002510
            ALLOW_S1_INTERRUPT;                                                     002520
1003              EQU          X(1003)                                              002530
            INHIBIT_S2_INTERRUPT;                                       INT2X       002540
1004              EQU          X(1004)                                              002550
            ALLOW_S2_INTERRUPT;                                                     002560
1005              EQU          X(1005)                                              002570
            INHIBIT_3_INTERRUPT;                                        INT3X       002580
1006              EQU          X(1006)                                              002590
            ALLOW_S3_INTERRUPT;                                                     002600
1007              EQU          X(1007)                                              002610
            INHIBIT_S4_INTERRUPT;                                       INT4X       002620
1008              EQU          X(1008)                                              002630
            ALLOW_S4_INTERRUPT;                                                     002640
1009              EQU          X(1009)                                              002650
            INHIBIT_S5_INTERRUPT;                                       INT5X       002660
100A              EQU          X(100A)                                              002670
            ALLOW_S5_INTERRUPT;                                                     002680
100B              EQU          X(100B)                                              002690
            INHIBIT_INTERRUPT_6;                                        INT6X       002700
100C              EQU          X(100C)                                              002710
            ALLOW_INTERRUPT_6;                                                      002720
100D              EQU          X(100D)                                              002730
            INHIBIT_INTERRUPT_7;              INT 7 HAS LOWEST          INT7X       002740
100E              EQU          X(100E)        PRIORITY                              002750
            ALLOW_INTERRUPT_7;                                                      002760
100F              EQU          X(100F)                                              002770
```

```
                           **
                           *          DISCRETE OUTPUTS                                              002780
                           *                                                                        002790
                           *                                                                        002800
                           *      DISCRETES DL010 THRU DL030 ARE DEFINED AS CODED ADDR LINES        002810
ASSEMBLED                  *      TO ROUTE DATA TO EXTERNAL DEVICES                                 002820
SET/RESET                  *                                                                        002830
DISCRETE                   *                            A3 A2 A1                                    002840
"OPERANDS"                 *                             0  0  0    RESET                          002850
  1010        RESET_A1    EQU      X(1010)               0  0  1    S1                             002860
  1011        SET_A1      EQU      X(1011)               0  1  0    S2          DL010              002870
  1012        RESET_A2    EQU      X(1012)               0  1  1    S3                             002880
  1013        SET_A2      EQU      X(1013)               1  0  0    S4          DL020              002890
  1014        RESET_A3    EQU      X(1014)               1  0  1    S5                             002900
  1015        SET_A3      EQU      X(1015)               1  1  0    S6          DL030              002910
                                                         1  1  1    SPARE
```

Reference figure 10.(C)

```
                          **          LIBRARY      DOIT_ARCTAN                                      012400
                          *    LONG ARCTAN - TWO UNNORMALIZED ARGUMENTS                             012410
                          *                                                                         012420
             MACHINE      *    R2,3 PROPORTIONAL TO SINE   (NOT BOTH                                012430
MEMORY       LANGUAGE     *    R0,1 PROPORTIONAL TO COSINE  TOO SMALL)                              012440
LOCATION     INSTRUCTIONS *    ANSWER SCALED P1 IN R0,1.  TWO REGISTERS PRUNED.                     012450
                          *    MAXIMUM TIME 518 MICROSECONDS FOR ARCTAN, 526 FOR ATAN_PIN           012460
  0037       D700          ATAN_PIN   PRN     0                                                     012470
  0038       F8044000      ARCTAN     RSAD    0,,1           HALVE COSINE                           012480
  003A       DE52                     FLG     5,2            SET C IF .LT.                          012490
  003E       D021  (003D)             BGE     $1                                                    012500
  003C       A800                     CLSD    0,0            TAKE MAGNITUDE                         012510
  003D       F428005B      $1         FETM    2,,ATC         SET UP INDICES                         012520
  003F       9C0C                     CLAM    0,,ATC1-ATC                                           012530
  0040       0016                     FET     1,6                                                   012540
  0041       F8044000                 RSAD    0,,1           HALVE SINE                             012550
  0043       DE53                     FLG     5,3            SET D IF .LT.                          012560
  0044       D021  (0046)             BGE     $2                                                    012570
  0045       A800                     CLSD    0,0            TAKE MAGNITUDE                         012580
  0046       AC70          $2         CLAD    7,0            ISI                                    012590
  0047       B875                     SUBD    7,5            ISI-ICI                                012600
  0048       BC05                     ADDD    0,5            ISI+ICI                                012610
  0049       DC70                     DIVD    7,0            X=(S-C)/(S+C)                          012620
  004A       AC57                     CLAD    5,7                                                   012630
  004B       6855                     MPYD    5,5            Z=X**2                                 012640
  004C       AD4B                     CLAD    X4,,ATC2-ATC                                          012650
  004D       6805          $3         MPYD    0,5            SUM SERIES IN Z                        012660
  004E       BF2A                     ADDD    IX2,4                                                 012670
  004F       CC23  (004D)             BXUD    2,,$3                                                 012680
  0050       5807                     MPYD    0,7            FINISH ODD SERIES IN X                 012690
  0051       DEEE                Z→   FLG     14,14          ·SET C = C.EOR.D                       012700
  0052       D0D1  (0054)      Z+1→   BCF     $4                                                    012710
  0053       A800                     CLSD    0,0                                                   012720
  0054       4022          $4         RDF     2,,2           READ FLAGS D,C                         012730
  0055       F4244000                 LSA     2,,14                                                 012740
  0057       F5292000                 ADDM    X2,,F(.25)     ADJUST FOR QUADRANT                    012750
  0059       AC70                     CLAD    7,0            MOVE ANSWER                            012760
  005A       D560                     BBK     6              PRUNE SEVEN AND RETURN                 012770
  005B       288E6096      ATL        COND    F(+.318309854667)                                     012780
  005D       F26B56E5                 COND    F(-.106099021806)                                     012790
  005F       0822EAF2                 COND    F(+.063565605401)                                     012800
  0061       FA496711                 COND    F(-.044625393671)                                     012810
  0063       040A1927                 COND    F(+.031558174030)                                     012820
  0065       FD9388D0                 COND    F(-.018935106721)
              LABELS   (INSTRUCTIONS)         ACCUMULATORS AND        COMMENTS
                                              OPERANDS
```

Reference figure 10 (A)

```
                            **                                                                      013590
                            *    INTERRUPT ADDRESSES                                                013600
                                                                                                    013610
  0140                               ORG        X(140)                                              013620
  0140                     SCSM_INTRPT SCS                                                          013630
  0140       04000300                 BUC       POWER_ON_RTN          POWER ON                    EP013640
  0142       F80D0597                 BSV       POWER_DROPOUT_RTN     POWER OFF - EXECUTED        EP013650
  0144       FA0D6EA0                 BSV       1,,CMP_PMU_INTERRUPT_ADDR                         1 013660
  0146       04001DF1                 BUC       DUMP_MEMORY                                         013670
                            *                                                                   2**013680
  0148       FA0D8BA0       CMP_PMU_BSV BSV     1,,CMP_PMU_INTERRUPT_ADDR (SAME AS LOC 0144)      2 013690
                            *                                                                       013700
  0160                                 ORG      X(160)           EXTERNAL INTO - INT7 INTERR.    6B1013710
  0160       F80D0174                  BSV      FALSE_INTERRUPT       0                         IOSL013720
  0162       F80D17D6                  BSV      S1_INTERRUPT_RTN      S1 INTERRUPT                SL013730
  0164       F80D2712             (q)→ BSV      S2_INTERRUPT_RTN      S2 INTERRUPT                SL013740
  0166       F80D274A                  BSV      S3_INTERRUPT_RTN      S3 INTERRUPT                SL013750
  0168       F80D2786                  BSV      S4_INTERRUPT_RTN      S4 INTERRUPT                SL013760
  016A       F80D27AE                  BSV      S5_INTERRUPT_RTN      S5 INTERRUPT                3BT013770
  016C       F80D0174                  BSV      FALSE_INTERRUPT       6 FALSE INPUT               3BT013780
  016E       F80D0174                  BSV      FALSE_INTERRUPT       7 FALSE INPUT               3BT013790
  0170       F80D05F1                  BSV      EGG_TIMER_INTERRUPT (BACKUP FOR TYPE 6)              013800
  0172       F80D0808                  BSV      SIX_MS_INTERRUPT      (TY6)                       3BT013810
                            *                                                                    3BT013820
                            FALSE_INTERRUPT;             NOISE INPUT ON SPARE INTERRUPT INPUT LINE(S) 8BT013830
  0174       F80F1000                  IOC      INHIBIT_INTERRUPT_0   TURN OFF, IF ON          D10BT013840
  0176       F80F1000                  IOC      INHIBIT_INTERRUPT_6   TURN OFF, IF ON             3BT013850
  0178       F80F100E                  IOC      INHIBIT_INTERRUPT_7   TURN OFF, IF ON             3BT013860
  017A       F4080F00                  FETM     0,X(0F00)      FALSE EXTERNAL INTERRUPT           3BT013870
  017C       F80D0940                  BSV      SET_FAIL_DATA TELEMETRY OUTPUT                    3BI013880
  017E       D5F0                      BBK      15             CANCEL INTERRUPT                      013890
  017F       9524          ECSM_INTRPT ECS
```

```
**      FOREGROUND (SLOT) LEVEL ROUTINES ARE ENTERED UNDER CONTROL OF          EX022160
*       THE FOLLOWING SLOT_TABLE. THE SIX_MS_INTERRUPT ROUTINE EXITS            EX022170
*       THROUGH SLOT_EXEC WHICH WORKS ITS WAY THROUGH THE TABLE. THE            EX022180
*       END_SLOT ROUTINE RETURNS CONTROL TO MAIN PROGRAM (BACKGROUND)           EX022190
*       OR KALMAN (FAR BACKGROUND) DEPENDING ON WHICH ONE THE SIX_MS            EX022200
*       INTERRUPT BROKE INTO. THE NEXT 6 MS ENTRY WILL START AT THE             EX022210
*       NEXT SLOT ENTRY.                                                        EX022220
*                                                                               EX022230
MEMORY  PROGRAM                                                                 EX022240
LOCATION ADDRESS   SLOT_TABLE;                                       SLOT  1    EX022250
        * 1                                                                     EX022260
0686    1158             CON    START_PANEL_INPUT & RESET MALF LIGHT   162      EX022270
0687    2AF2             CON    NAV_LOOP_72MS                                   EX022280
0688    06F4             CON    SPARE_SLOT                                      EX022290
0689    06F5             CON    SLOT_1_END      MAIN PROGRAM ENTRY              EX022300
        * 2                                                          SLOT  2    EX022310
068A    2A34             CON    GIMBAL_ANGLE_ENCODING                           EX022320
068B    1026             CON    TKR_SHEAR_36MS                        238       EX022330
068C    2B17             CON    NAV_LOOP_72MS_OVERHANG                          EX022340
068D    27FE       (r)→ CON    SENSOR_LOG_72MS         TIMING =   USEC         EX022350
068E    06F4             CON    SPARE_SLOT                                      EX022360
068F    06F0             CON    END_SLOT                                        EX022370
        * 3                                                          SLOT  3    EX022380
0690    116A             CON    CONTROL_AND_DISPLAY_ENTRY             4800      EX022390
        *                       FOLLOWING MUST BE 2 SLOT TIMES BEFORE           EX022400
        *                       FIRST CON ONCE_PER_SEC_LOOP                     EX022410
0691    06EE             CON    START_CHRON_TEST                                EX022420
0692    06F4             CON    SPARE_SLOT                                      EX022430
0693    06F0             CON    END_SLOT                                        EX022440
        * 4                                                          SLOT  4    EX022450
0694    2AA4             CON    THIRTY_SIX_MS_NAV_LOOP                118       EX022460
0695    4B71             CON    DEBUG                                 910     D 6EX022470
0696    06F4             CON    SPARE_SLOT                                      EX022480
0697    06F0             CON    END_SLOT                                        EX022490
        * 5                                                          SLOT  5    EX022500
0698    070B             CON    ONCE_PER_SEC_LOOP                               EX022510
0699    06F4             CON    SPARE_SLOT                                      EX022520
069A    06F0             CON    END_SLOT                                        EX022530
        * 6                                                          SLOT  6    EX022540
069B    0805             CON    TAKE_OFF                                        EX022550
069C    2A34             CON    GIMBAL_ANGLE_ENCODING                           EX022560
069D    06F4             CON    SPARE_SLOT                                    D 6EX022570
069E    06F0             CON    END_SLOT                                        EX022580
        * 7                                                          SLOT  7    EX022590
069F    1F0A             CON    GREAT_CIRCLE_ENTRY                  * FULL *    EX022600
06A0    06F0             CON    END_SLOT                                        EX022610
        * 8                                                          SLOT  8    EX022620
06A1    1026             CON    TKR_SHEAR_36MS                        238       EX022630
06A2    1F0A             CON    GREAT_CIRCLE_ENTRY                    4500      EX022640
06A3    06F4             CON    SPARE_SLOT                                      EX022650
06A4    06F0             CON    END_SLOT                                        EX022660
        * 9                                                          SLOT  9    EX022670
06A5    1F0A             CON    GREAT_CIRCLE_ENTRY                    4000      EX022680
06A6    06F4             CON    SPARE_SLOT                                      EX022690
06A7    06F0             CON    END_SLOT                                        EX022700
        * 10                                                         SLOT 10    EX022710
06A8    2AA4             CON    THIRTY_SIX_MS_NAV_LOOP                118       EX022720
06A9    2A34             CON    GIMBAL_ANGLE_ENCODING                           EX022730
06AA    4B71             CON    DEBUG                                 910       EX022740
06AB    06F4             CON    SPARE_SLOT                                      EX022750
06AC    06F0             CON    END_SLOT                                        EX022760
        * 11                                                         SLOT 11    EX022770
06AD    0F85             CON    TKR_72_MS       RESOLVER CORR OR SLEW           EX022780
06AE    26D4             CON    STEPPER_11_AND_12_OUTPUT                        GL022790
06AF    06F4             CON    SPARE_SLOT                                      EX022800
06B0    06F0             CON    END_SLOT                                        EX022810
        * 12                                                         SLOT 12    EX022820
06B1    06F4             CON    SPARE_SLOT                                      EX022830
06B2    06F4             CON    SPARE_SLOT                                      EX022840
06B3    06F0             CON    END_SLOT                                        EX022850
        * 13                                                         SLOT 13    EX022860
06B4    1158             CON    START_PANEL_INPUT_A                   108       EX022870
06B5    2AF2             CON    NAV_LOOP_72MS                                   EX022880
06B6    06F4             CON    SPARE_SLOT                                      EX022890
06B7    06F0             CON    END_SLOT                                        EX022900
        * 14                                                         SLOT 14    EX022910
06B8    2A34             CON    GIMBAL_ANGLE_ENCODING                           EX022920
06B9    1025             CON    TKR_SHEAR_36MS                        238       EX022930
06BA    2517             CON    NAV_LOOP_72MS_OVERHANG                          EX022940
06BB    27FE       (s)→ CON    SENSOR_LOG_72MS         TIMING =   USEC         EX022950
06BC    06F4             CON    SPARE_SLOT                                      EX022960
06BD    06F0             CON    END_SLOT                                        EX022970
        * 15                                                         SLOT 15    EX022980
06BE    115A             CON    CONTROL_AND_DISPLAY_ENTRY             4800      EX022990
06BF    06F4             CON    SPARE_SLOT                                      EX023000
06C0    06F0             CON    END_SLOT                                        EX023010
        * 16                                                         SLOT 16    EX023020
06C1    2AA4             CON    THIRTY_SIX_MS_NAV_LOOP                118       EX023030
06C2    4571             CON    DEBUG                                 910     D 6EX023040
06C3    06F4             CON    SPARE_SLOT                                      EX023050
06C4    06F0             CON    END_SLOT                                        EX023060
        * 17                                                         SLOT 17    EX023070
06C5    070B             CON    ONCE_PER_SEC_LOOP                               EX023080
06C6    06F4             CON    SPARE_SLOT                                      EX023090
06C7    06F0             CON    END_SLOT                                        EX023100
        * 18                                                         SLOT 18    EX023110
06C8    2A34             CON    GIMBAL_ANGLE_ENCODING
```

```
0609    06F4                        CON     SPARE_SLOT                                              D 6EX023120
060A    06F0                        CON     END_SLOT                                                  EX023130
                    * 19                                                    SLOT    19                EX023140
060B    09B5                        CON     SRCH_TRK_ENTRY FOREGROUND 144MS SRCH/TRK                  EX023150
060C    06F4                        CON     SPARE_SLOT                                                EX023160
060D    06F0                        CON     END_SLOT                                                  EX023170
                    * 20                                                    SLOT    20                EX023180
060E    1026                        CON     TKR_SHEAR_36MS                              238           EX023190
060F    0882                        CON     DATA_MATRIX_UPDATE                                        EX023200
06D0    06F4                        CON     SPARE_SLOT                                                EX023210
06D1    08F0                        CON     END_SLOT                                                  EX023220
                    * 21                                                    SLOT    21                EX023230
06D2    49A0                        CON     START_TELMU_INPUT                                         EX023240
06D3    313E                        CON     DEAD_RECKON_NAVIGATION                                    EX023250
06D4    200B                        CON     POSITION_PROCESSING                                       EX023260
06D5    06F4                        CON     SPARE_SLOT                                                EX023270
06D6    06F0                        CON     END_SLOT                                                  EX023280
                    * 22                                                    SLOT    22                EX023290
06D7    2AA4                        CON     THIRTY_SIX_MS_NAV_LOOP                      118           EX023300
06D8    2A34                        CON     GIMBAL_ANGLE_ENCODING                                     EX023310
06D9    4B71                        CON     DEBUG                                                     EX023320
06DA    06F4                        CON     SPARE_SLOT                                                EX023330
06DB    06F0                        CON     END_SLOT                                                  EX023340
                    * 23                                                    SLOT    23                EX023350
06DC    0F85                        CON     TKR_72_MS       RESOLVER CORR OR SLEW                     EX023360
06DD    49B3                        CON     TMU_PROCESS                                               EX023370
06DE    26D4                        CON     STEPPER_11_AND_12_OUTPUT                                  G0023380
06DF    06F4                        CON     SPARE_SLOT                                                EX023390
06E0    06F0                        CON     END_SLOT                                                  EX023400
                    * 24                                                    SLOT    24                EX023410
06E1    41A9                        CON     TELEMETRY_OUTPUT_KALM                       ***         2KD023420
06E2    06F4                        CON     SPARE_SLOT                                                EX023430
06E3    08E0                        CON     LAST_SLOT                                                 EX023440

*********       SENSOR LOG PROCESSING       **********                            SL092580
                    *   SUBROUTINE TO SYNC TELEM_TIME REF WITH                                        SL092590
                    *   DATA CONVERTER UPDATE TIME                                                    SL092600
                    *                                                                                 SL092610
26EF    86FE  (00FE)    TIME_SYNC   FETD    0,,TIME         @ .006B31 SEC                             SL092620
26F0    F8065F1B                    MPYD    0,,=DF(.006/.0065)  INIT TIME REF FOR SYNC                SL092630
26F2    F807736D                    STAD    0,,KAL_TLM_REF                                            KF092640
26F4    F00B5F20                    ADDD    0,,=DF(.416/.0065B31)   WITH DATA CONVERTER               SL092650
26F6    F8076004                    STAD    0,,TELEM_TIME_REF   FOR OUTPUTTING                        SL092660
26F8    0155                        IOC     LOCK_TELEMETRY      TELEMETRY VALUES                      SL092670
26F9    1000                        IO_DELY 0               LOCK 32/128 TEL @ TWN 16/112              SL092680
26FA    0128                        IOC     SENSE_SW_A1     ANY PIP UNLOCKS TELEM                     SL092690
26FB    D510                        BBK     1                                                         SL092700
                    * ENTER WITH R0 A POSITIVE INTEGER   10000 DECIMAL                                SL092710
                    * ROUTINE CONVERTS TO BCD 1234, LEAVING RESULT IN R0 UPON EXIT                    SL092720
26FC    F4188000    SL_BCD          FETM    1,,X(8000)          R0,1 DIGIT/RESIDUE                  2SL092730
26FE    A402                        CLA     0,2             ARG @B15     2 RESULT                     SL092740
26FF    F8065F22                    MPYD    0,,=DF(1D-3) 0,1 @ D3B15                                  SL092750
2701    A420                        CLA     2,0             XXX1    FIRST (MS) DIGIT                  SL092760
2702    9000                        CLAM    0,,0                                                      SL092770
2703    400A                        MP1DM   0,,10                                                     SL092780
2704    F4240010                    LSA     2,,4            XX1X                                      SL092790
2706    B420                        ADD     2,0             XX12                                      SL092800
2707    9C00                        CLAM    0,,0                                                      SL092810
2708    4C0A                        MP1DM   0,,10                                                     SL092820
2709    F4240010                    LSA     2,,4            X12X                                      SL092830
270B    B420                        ADD     2,0             X123                                      SL092840
270C    9C00                        CLAM    0,,0                                                      SL092850
270D    4C0A                        MP1DM   0,,10                                                     SL092860
270E    F4240010                    LSA     2,,4            123X                                    D 2SL092870
2710    B420                        ADD     2,0             1234                                      SL092880
2711    D510                        BBK     1                                                         SL092890
                    *                                                                                 SL092900
                    *   SENSOR LOG INTERRUPT ROUTINES                                                 SL092910
                    *                                                                                 SL092920
                    *                                                                                 SL092930
                            S2_INTERRUPT_RTN;                                                         SL092940
2712    DF00                        LGC     INTERRUPT_INHIBIT PREVENT TYPE 6                          SL092950
2713    F40D6DB6                    PIP     0,S2_TIME_MKR+1  EVENT MKR NZ = 2USEC CNTR                SL092960
2715    F02C6DDF                    FET     2,,SL_TIME2_CHK R0,1 TIME R2 CNT                        2SL092970
2717    9820                        COMM    2,,0                                                      SL092980
2718    D05E  (2727)                BRE     $1              =0  1ST INTERRUPT                         SL092990
2719    9AFE  (00FE)                COMD    0,,TIME                                                 2SL093000
271A    D05C  (2727)                BRL     $1              <0 TIME SINCE LAST >.8 SEC              2SL093010
271B    9421                        ADDM    2,,1            INCR CNT IF LESS THAN .8                2SL093020
271C    F0276DE1                    STA     2,,SL_INT2_CNT  SINCE LAST INT                          2SL093030
271E    9825                        COMM    2,,5                                                    2SL093040
271F    D05F  (272F)                BRL     $2              <0 CNT < 5 AND DT <.8                   2SL093050
2720    F80F1004                    IOC     INHIBIT_S2_INTERRUPT CNT=5 AND DT <.8                   2SL093060
                    *                                       TURN OFF THIS INT                       2SL093070
2722    F4080060                    FETM    0,,X(60)                                                2SL093080
2724    F80D094C                    BSV     SET_FAIL_DATA FAIL INDIC FOR LOST INTERRUPT             2SL093090
2726    D008  (272F)                BOC     $2                                                      2SL093100
2727    9021        $1              CLAM    2,,1            CNT =1, EITHER 1ST INT, OR              2SL093110
2728    F0276DE1                    STA     2,,SL_INT2_CNT  DT >.8 SINCE LAST                       2SL093120
272A    9EFE  (00FE)                CLAD    0,,TIME                                                 2SL093130
272B    F00B5F24                    ADDD    0,,=DF(.8/.006B31)                                      2SL093140
272D    F8076DDF                    STAD    0,,SL_TIME2_CHK                                         2SL093150
272F    F80F1013    $2   (t) →      IOC     SET_A2          ADDR LINE = 010 (S2)                    2SL093160
2731    F80F1041                    IOC     SERIAL_BUFFER_INTERNAL_CONTROL                            SL093170
2733    F80F102C                    IOC     LOAD_SERIAL_BUFFER                                        SL093180
2735    F00D8DBF                    POP     0,,S2_BCD_CNT                                             SL093190
```

```
2737    F80F102A                IOC     SHIFT_SERIAL_BUFFER  ALLOW 32USEC FOR SHIFT         SL093200
2739    F80D4B13                BSV     TIME_DELAY$32    DELAY 32USEC                       SL093210
273B    F80F1012                IOC     RESET_A2     RESET ADDR LINE 2                      SL093220
273D    F00A6DB5                CLAD    0,,S2_TIME_MKR                                     6SL093230
273F    F8065F26                MPYD    0,,=DF(2/93.75)  RESC 93.75B31 USEC                6SL093240
2741    F00B6DED                ADDD    0,,SENSOR_LOG_TIME                                 6SL093250
2743    F8076DE5                STAD    0,,S2_TIME_MKR                                    6SL093260

2748    DF10                    LGC     INTERRUPT_INHIBIT+NE  ENABLE INTERRUPTS             SL093290
2749    D520                    BBK     2                                                 2SL093300
                                                                                            SL093310
                        **                                                                10SL094610
                         *  SENSOR LOG 72 MILLISEC PROCESSING                               SL094620
                         *                                                                  SL094630
                        SENSOR_LOG_72MS,;                                                   SL094640
27FE    F8006DB5        S2_72MS FETD    0,,S2_TIME_MKR   MKR AND EVENT TIME        +2       SL094650
2800    D260   (2821)           BRE     SL_72MS_RESET   =0  NO S2 ACTIVITY                  SL094660
2801    F40A0258                CLA     0,,S2_CNT    TELEM CNT  1B11                        SL094670
2803    9604   (0064)           ADD     0,=X(0010)   INCR BY 1  TELEM CNT 2047 MAX          SL094680
2804    F4005F28                EXT     0,0,=X(7FF0) REMOVE S/M MODE BIT                    SL094690
2806    A410                    CLA     1,0                                                 SL094700
2807    0209                    SNS     DISCRETE_INPUT+2    X(0009)                         SL094710
2808    D012   (280B)           BNE     $1           NE SENSE FALSE                         SL094720
2809    F4198000                ADDM    1,,X(8600)   EQ  SENSE TRUE, ADD MODE B17           SL094730
280B    F0170258  $1   (u)→     STA     1,,S2_CNT        TO TELEM CNT                      XT094740
280D    F0050800                RSL     0,,4         CNT TO 1B15                            SL094750
280F    9401                    ADDM    0,,1         CNT+1 FOR NEXT INTERRUPT               SL094760
2810    F80D28FC                BSV     SL_BCD       MAX CNT BCD = 2047                    6SL094770
2812    F0076DBF  (v)→          STA     0,,S2_BCD_CNT SAVE FOR NEXT INTERRUPT               SL094780
2814    FC0A6D85                CLAD    0,,S2_TIME_MKR  EVENT TIME 93.75B31 USEC           6SL094790
2816    FC040100                LSAD    0,,8         SCL 93.75B23 USEC                   D 6XT094800
2818    F0070256                STA     0,,S2_TIME   FOR TELEM                             XT094810
281A    F8040800                RSAD    0,,4                                               XT094820
281C    F0170257                STA     1,,S2_TIME+1 .                                     XT094830
281E    B800                    SUBD    0,0                                                6SL094840
281F    F8076DB5                STAD    0,,S2_TIME_MKR  RESET EVENT MKR                    6SL094850
                                BUC     SL_72MS_RESET                                       SL094860
                        SL_72MS_RESET;                                                      SL095930
28D4    F80F1032                IOC     INTERRUPT_CONTROL+2        PREVENT EXT INT WHILE   6SL095940
                         *                                          RESETTING EVENT TIMES  6SL095950
28D6    F80F1028                IOC     ZERO_TIME_COUNTER  RESET REAL-TIME CNTR 10 0        SL095960
28D8    9EFC   (00FC)           CLAD    0,,GM_TIME    TIME @ 6B31 MSEC                      SL095970
28D9    F0040040                LSAD    0,,6          RESC 93.73B31 USEC                    SL095980
28DB    F0076DBD                PTRD    0,,SENSOR_LOG_TIME             +0                   SL095990
28DD    F80F1030                IOC     INTERRUPT_CONTROL             ENABLE EXT INT       6SL096000
28DF    D5F0                    BBK     15                                              D 6SL096010
```

SUMMARY OF ASSEMBLER INSTRUCTIONS

AGO      assembler unconditional branch (see "Macro" section).

BSS  
BSSD      define block of (variable) storage, single and double word.

CON  
COND      define constant, single and double (see "Types of Constants").

CSECT      start (or resume) control section (see "Control Sections").

DELE      delete the designated source cards on last run source tape.

ECS      end checksum.

END      end of assembly.

EQU      equivalence.

GENER      print Macro-expanded instructions.

IFA      assembler arithmetic set symbol/variable symbol conditional branch (see "Macro" section).

IFC      assembler character string set/variable symbol conditional branch (see "Macro" section).

| | |
|---|---|
| INCLUDE | include (assign absolute locations to) the named control section (see "Control Sections"). |
| LIBR | include named library source module in source input for assembly. |
| LIT
LITD | define literal constant, single and double (see "Literals"). |
| LITORG | include (assign absolute locations to) the unassigned entries in the literal pool and mark them as no longer available. |
| MACRO | start macro definition (see "Macros"). |
| MEND | end macro definition (see "Macros"). |
| MEXIT | end macro expansion (see "Macros"). |
| MNOTE | print specified message during macro expansion (see "Macros"). |
| NOGENER | inhibit printing of macro-expanded instructions. |
| NOPRINT | inhibit printing on final assembler pass output. |
| NULL | null instruction. |
| ORG | set assembler control section location counter to specified value. |
| PIN
PIND | define programmed instruction. |
| PRINT | generate final pass listing. |
| SETA | assign arithmetic value to set symbol (see "Macros"). |
| SETC | assign character string to set symbol (see "Macros"). |
| SCS | start checksum. |
| TAPE | generate "MYLRTAPE" data set. |
| TWT | timing information multiplier. |
| VIS | generate perforated tape visual header. |

We claim:

1. A multiple-sensor reconnaissance system for an aircraft having a navigation system and a digital computer therein, said computer continually carrying present navigation parameters from said navigation system, comprising:

a. a plurality of sensors each capable of making frames of intelligence according to the type of energy sensed thereby;

b. first trigger means in each of said sensors for generating and passing a marker signal to said computer each time a sensor frame of information is to be taken;

c. means in said computer responsive to each said marker signal for identifying the sensor, producing a new respective frame count number and sending said number back to the originating sensor;

d. number recording means in each sensor for indicating said frame count number on said intelligence frame corresponding to the said marker signal;

e. information collecting means in said computer for producing a block of digital information signals containing said frame count number, sensor identification and existing navigation parameters from said navigation system including geographical location of said aircraft; and f. information recording means for recording said computer-produced information signals essentially simultaneously with each time a marker signal is sent to said computer.

2. Apparatus in accordance with claim 1 wherein each of said sensors comprises an individual on-off control means, a holding register for receiving said frame count number from said computer, and second trigger means mechanically operated by said sensor to enter said frame count number at the desired time directly onto its associated frame.

3. Apparatus in accordance with claim 1 wherein one or more of said sensors comprises a photographic camera, frame count number display means for displaying successively said numbers supplied from said computer, means for optically exposing each said displayed number onto the film in said camera, and second trigger means for timing the number display exposure on said film once each frame period.

4. Apparatus in accordance with claim 1 wherein one or more of said sensors comprises a magnetic recording device including a recording medium, means for applying the successive frame count numbers received from said computer onto said medium when triggered, and second trigger means for applying respectively said successive numbers once each frame period.

5. Apparatus in accordance with claim 1 wherein one or more of said sensors comprises a radar device including a cathode ray tube, a camera for photographing the face of said tube, means for exposing the film of said camera to a display of the respective frame count numbers provided by said computer, and second trigger means for providing said display once each camera frame period.

6. Apparatus in accordance with claim 1 wherein said sensor identification means comprises selector logic for providing a parallel format multiple-line binary coded output from said computer, and gating means for passing said frame count number to only the selected sensor.

7. Apparatus in accordance with claim 1 wherein said frame count number-producing means comprises means for generating a multiple-bit serial pulse code output from said computer representing said number, and means for adding a numerical "one" to the frame count number of a sensor each time a marker signal is received therefrom.

8. In a multiple-sensor reconnaissance system for an aircraft having a navigation system and a digital computer, said computer continually carrying present navigation parameters from said navigation system; the method of correlating the products of the sensors, comprising:

a. designating a discrete portion of sensor intelligence gathered as a frame;

b. generating a marker signal for each frame to be made by each sensor;

c. assigning a frame count number in consecutive order to identify each frame from said sensors in response to each marker signal;

d. producing a sensor identification signal from each said marker signal;

e. supplying each said frame count number to the respective said sensor from which the corresponding marker signal came;

f. indicating each said frame count number in readable form directly on said sensor frame to which it applies; and g. substantially simultaneously recording a line of information containing the identifying frame count number, its sensor number, and existing navigation parameters from said navigation system including geographical location of said aircraft; whereby h. each sensor frame can be quickly paired with the recorded information line giving its geographical location and other data.

9. Method in accordance with claim 8 wherein said information lines are magnetically recorded, and including printing a listing of said recorded information for ground comparison with subsequently processed sensor frames.

10. In a correlation system for the sensor product data of an airborne reconnaissance system including a navigation system; the method of obtaining precise geographical locations of the frames of sensor data gathered during a flight, comprising:

a. recording data concerning each sensor frame made, said data including identification of the particular sensor frame and the existing coordinate location of the aircraft at the exact time said frame was made according to the information from said navigation system;

b. flying over and photographing two substantially spaced ground points whose coordinate locations are known beforehand, and recording the same data for said points the same as for all the other sensor frames made;

c. subsequently comparing the said recorded data for said two points with the said known locations to determine the coordinate location differences; and d. applying computed correction factors derived from said differences to all other said sensor frame location data recorded; whereby e. whatever inaccuracy and bias of said navigation system exists is removed from the final results.

* * * * *